(12) United States Patent
Tar et al.

(10) Patent No.: US 9,513,178 B2
(45) Date of Patent: Dec. 6, 2016

(54) SENSOR DEVICE

(71) Applicant: Optoforce Müszaki Fejlesztöés Innovációs Kft, Székesfehérvár (HU)

(72) Inventors: Ákos Sándor Tar, Recsk (HU); György Gábor Cserey, Budapest (HU); József Veres, Szolnok (HU)

(73) Assignee: Optoforce Muszaki Fejleszto Es Innovacios KFT, Szekesfehervar (HU)

( * ) Notice: Subject to any disclaimer, the term of this patent is extended or adjusted under 35 U.S.C. 154(b) by 55 days.

(21) Appl. No.: 14/358,815

(22) PCT Filed: Nov. 16, 2012

(86) PCT No.: PCT/HU2012/000124
§ 371 (c)(1),
(2) Date: May 16, 2014

(87) PCT Pub. No.: WO2013/072712
PCT Pub. Date: May 23, 2013

(65) Prior Publication Data
US 2014/0326882 A1 Nov. 6, 2014

(30) Foreign Application Priority Data
Nov. 17, 2011 (HU) .................................. 100633

(51) Int. Cl.
G06F 3/041 (2006.01)
G01L 1/24 (2006.01)
G01L 5/16 (2006.01)

(52) U.S. Cl.
CPC .................. G01L 1/248 (2013.01); G01L 1/24 (2013.01); G01L 5/166 (2013.01)

(58) Field of Classification Search
CPC ............ G01J 5/10; G06G 3/041; G06F 3/016
See application file for complete search history.

(56) References Cited

U.S. PATENT DOCUMENTS

| 7,707,001 B2* | 4/2010 | Obinata | B25J 13/082 356/32 |
|---|---|---|---|
| 2003/0173708 A1 | 9/2003 | Paritsky et al. | |
| 2008/0106258 A1* | 5/2008 | Torres-Jara | G01L 5/226 324/207.2 |
| 2009/0315989 A1 | 12/2009 | Adelson | |
| 2010/0155579 A1 | 6/2010 | Torres-Jara | |
| 2010/0253650 A1* | 10/2010 | Dietzel | G01L 1/247 345/175 |
| 2012/0240691 A1* | 9/2012 | Wettels | G01L 1/24 73/862.624 |
| 2013/0272585 A1* | 10/2013 | Mueller | G06K 9/0004 382/124 |

OTHER PUBLICATIONS

International Search Report (3 pgs.) and Written Opinion of the International Searching Authority (5 pgs.), European Patent Office, Mar. 21, 2013.

* cited by examiner

*Primary Examiner* — Christine Sung
(74) *Attorney, Agent, or Firm* — Wood Herron & Evans LLP

(57) ABSTRACT

The invention is a sensor device comprising a carrier element (24), at least one light emitting element (20) arranged on the carrier element (24), at least one light detecting element (22) arranged on the carrier element (24), a cover layer (12) reflecting at least one part of the light emitted by the light emitting element (20) to the at least one light detecting element (22), and at least one transparent filler element (16, 18) filling at least partly the space between the carrier element (24) and the cover layer (12) and being made of a flexible material.

15 Claims, 7 Drawing Sheets

SENSOR DEVICE

This application claims priority, under Section 371 and/or as a continuation under Section 120, to PCT Application No. PCT/HU2012/000124, filed on Nov. 16, 2012, which claims priority to Hungary Application No. P 1100633, filed on Nov. 17, 2011.

TECHNICAL FIELD

The invention relates to a sensor device. More particularly, the invention relates to a sensor device adapted to sense pressure and force acting on its surface.

BACKGROUND ART

Sensory perception plays an increasingly important role in robotics. By means of sensory perception, it is desirable to obtain as much information about the environment as possible to ensure that robots respond optimally. In robotics, the most frequent tasks are gripping, positioning and object relocation. The approaches used so far were indeed feasible in a well-modelled environment, where the position and orientation of the object were known. The robotic arms and gripping devices becoming increasingly widespread which fact led necessarily to the expectation of applying them in as broad a range as possible, and also in an undefined environment. A future goal of robotics is that robots should have similar capabilities to human beings and provide assistance for them. To this end, it is indispensable that robots should handle objects (for example door handles, cups, buttons, glasses, etc.) relating to a task with a skill and safety similar to humans.

In the course of interaction with various objects, the primary information is generated by tactile perception. This interaction may carry important information not only on the fingers, but also on the whole surface of the robot, and therefore extension of sensors to the complete surface of the robot, the creation of a kind of artificial skin, is a further goal for researchers.

An overview about generally applied sensors and pressure sensor devices is given by J. Tegin and J. Wikander, Tactile sensing in intelligent robotic manipulation—a review, *Industrial Robot: an International Journal*, Vol. 32, No. 1, pp. 64-70 (2005). In summary, it can be stated that the current sensor devices have rigid surface and structure. The contact established between the object and the sensor device is point-like in most cases, especially in the case of rigid objects. It is a great disadvantage of the point-like contact that little information can be obtained about the given object and its surface, and stability of gripping is also reduced.

In the case of pressure sensor devices having elastic surface, as a result of applying a gripping force, the surface of the sensor device fits to the surface of the object, thereby increases the stability of the grip and information about the surface and material characteristics of the object can be collected from larger surface. In many prior art solutions, it was attempted to cover rigid structure sensor devices with a flexible material.

Another important task, in which these approaches are less beneficial, is determining the direction and location of pressure. Sensing the direction of tactile perception (from the forces exerted on one finger for example) is especially important in determining slipping and the characteristics of the surface.

In US 2010/0253650 A1, such an optical pressure sensor device is disclosed which has a flexible dome, i.e. cover layer, and it has furthermore a light reflecting layer to reflect the signal of light emitting elements to light detecting elements. It is a disadvantage of this approach that the useful surface of the sensor device, on which it can detect with an appropriate accuracy the components of forces acting thereon, is limited by the emission angle of the light emitting element and by the angle of vision of the light detecting elements. A further disadvantage of the approach is that as a result of easy compressibility, it is only able to measure the force within a relatively small value range.

In US 20091315989 A1 a sensor with elastomeric filler material is disclosed. In US 2003/0173708 A1 optical shield is applied between respective light sources and light detectors.

In U.S. Pat. No. 4,704,909 a pressure sensor device having also optical embodiments is disclosed, in which an elastic ring is applied under a rigid surface which is actually a flat covering of the sensor device.

In U.S. Pat. Nos. 4,635,479 and 4,747,313 a pressure sensor device having a dome-shaped pressure sensor surface made from a rigid material is disclosed. In U.S. Pat. No. 4,405,197 an optical principle based pressure sensor device having an elastic pressure sensor surface is disclosed.

A number of other three-dimensional sensor devices designed for determining the components of pressure force are known. Most of them are based on MEMS (Micro-Electro-Mechanical Systems) technology, such as the sensor device disclosed in US 2009/0320611 A1. In general, these sensor devices are highly susceptible to damage and have a small sensor surface, which practically makes them suitable for measuring forces acting point-like.

Another well-known and broadly used solution is applying optical pressure measurement by CCD or CMOS cameras. The basic principle of operation in this case is that various markers well-detectable by camera are placed on an elastic material above the camera, and the distance of the markers from the camera changes as a result of material deformation (external force). The change in the distance and hence the rate of surface deformation can be detected on the basis of the camera picture, i.e. the forces acting on the surface can be calculated. Such a realization is disclosed in the following study: P. Lang, Optical tactile sensors for medical palpation, *The Thirty-Fourth London District Science and Technology Conference*, pp. 1-5, (2004). The disadvantages of these realizations are the large size and the high calculation complexity.

Sensor devices may also be based on magnetic principles. According to the publication disclosing this approach (E. Torres-dara, I. Vasilescu, and R. Coral, A soft touch: Compliant Tactile Sensors for Sensitive Manipulation, Technical Reports, Massachusetts Institute of Technology, Computer Science and Artificial Intelligence Laboratory, 1 Mar. 2006), a magnet is fixed to the centre of an elastic dome above four Hall-sensors placed in one plane. With the deformation of the dome, the location of the magnet respect to the Hall-sensors changes which can be measured by a variation of the magnetic field, but the gripping of metal or magnetic objects may disturb the measurement. In the above, and also in the associated US 2010/0155579 A1 document, the optical realization of the discussed sensor device is mentioned. In the optical realization, a hollow dome reflecting the optical signals is applied above the optical signal emitting and detecting elements, but this limits the loadability and miniaturisation of the sensor device. A further disadvantage of this solution is that it does not prevent the ingress of external light into the sensor device.

The fact that the grippers only comprise a few sensor devices in robotics, especially located at the ends of fingers, is not a consequence of the quality of sensors. It is a huge problem to design the wiring of sensor devices and sensors, and with the increase in the number of sensors, the signals to be guided away and processed is growing, and this also increase the size of signal processing electronics. The application of sensor matrices (with row and column detection) assists the solving of this problem, but even in the case of one fingertip, when using a 8×8 sensor field, the application of at least 16 wires is necessary.

It is a common disadvantage of some of the above solutions that the angle of vision of applied light emitting elements and light detecting elements make a constraint on the size of the useful surface of the sensor device. The common disadvantage of a further part of solutions mentioned above is that their measuring range is heavily restricted, and because of their mechanical design, they are unsuitable for the measurement of force varying within a broad range.

In view of the known solutions the need has arisen to provide a sensor device being adapted to sense the impacts generated in various ways, e.g. as a result of force or pressure, with the possibility of implementation in a broad range of dimensions, having as large a surface as possible in relation to the sensor dimensions to detect the pressure vector and it is able to measure force and pressure, respectively, in the widest possible value range.

DISCLOSURE OF THE INVENTION

The primary object of the invention is to provide a sensor device which is free of the disadvantages of prior art solutions to the greatest possible extent.

A further object of the invention is to provide a sensor device being adapted to detect impacts generated in various ways, e.g. as a result of force or pressure, with the possibility of implementation in a broad range of dimensions thanks to its configuration. A further object of the invention is to provide a sensor device having as large a surface as possible in relation to the sensor dimensions to measure a pressure or force vector, i.e. the device has the largest possible surface to determine accurately the magnitude and direction of the pressure and force acting on its surface. The object of some embodiments of the invention furthermore is to provide a sensor device being adapted to measure force or pressure in a broad measuring range thanks to its design.

The objects of the invention can be achieved by providing a sensor device according to claim 1. Preferred embodiments of the invention are defined in the dependent claims.

BRIEF DESCRIPTION OF DRAWINGS

Preferred embodiments of the invention are described below by way of example with reference to the following drawings, where.

MODES FOR CARRYING OUT THE INVENTION

Figure 1A:
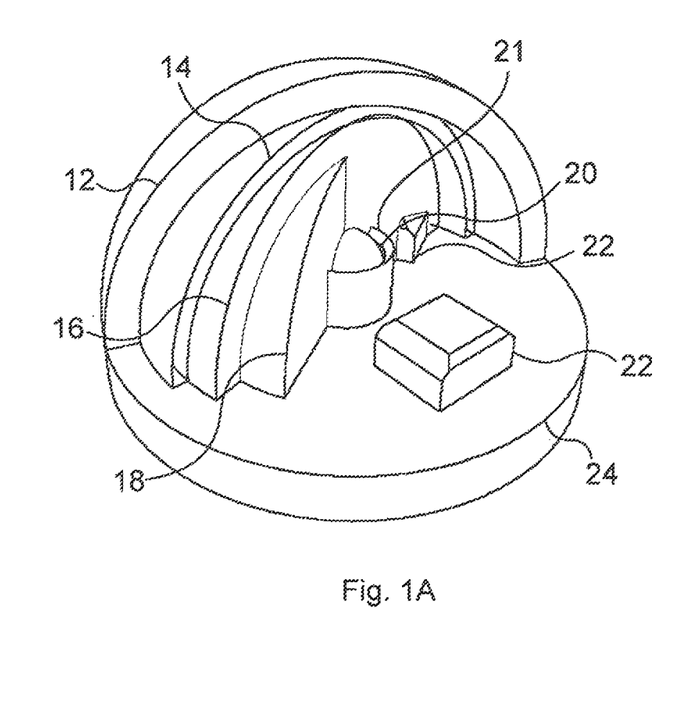
FIG. 1A is a structural drawing of an embodiment of the sensor device according to the invention.

The sensor device according to the invention operates on the basis of optical principles. FIG. 1A shows the structural view of an embodiment of the sensor device according to the invention. For a better view, the depicted details of various layers of the sensor device are folded out. The sensor device according to the invention comprises a carrier element 24, at least one, in the present embodiment one, light emitting element 20 arranged on the carrier element 24, at least one, in this embodiment three, light detecting element 22 arranged on the carrier element 24, and a cover layer 12 reflecting at least one part of the light emitted by the light emitting element 20 to at least one light detecting element. The carrier element of the sensor device according to the invention has a flat configuration in some of the depicted embodiments. In some preferred embodiments of the sensor device according to the invention, the light emitting element 20 is capable of emitting infrared light, and the light detecting element 22 is capable of detecting infrared light. In the present embodiment, on the carrier element 24 side of the cover layer 12 a light reflecting layer 14 is arranged, and the sensor device further comprises a first filler element 16 and a second filler element 18 having different refractivities, being transparent, filling up the space between the carrier element 24 and the light reflecting layer 14, and being made of a flexible material.

Figure 1B:
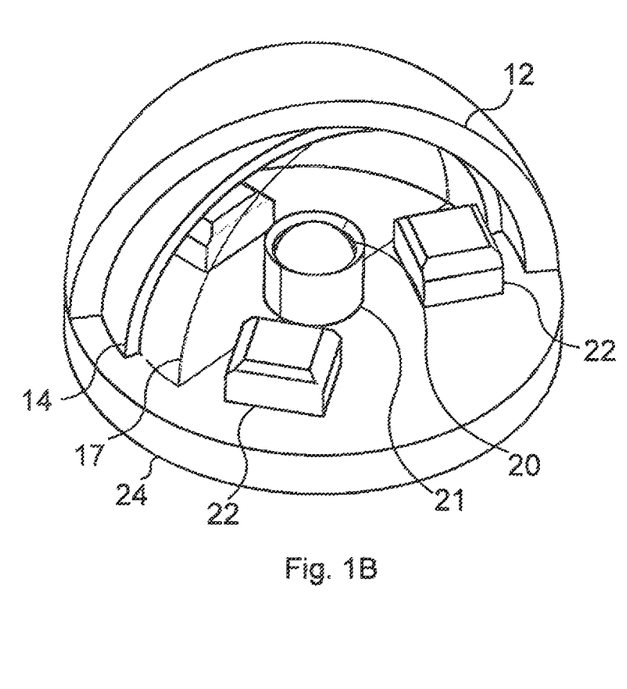
FIG. 1B is a structural drawing of a further embodiment of the sensor device according to the invention.

FIG. 1B shows a further embodiment of the sensor device according to the invention. The embodiment according to FIG. 1B deviates from that shown in FIG. 1A in that there is a single filler element 17 between the carver element 24 and the light reflecting layer 14. Numerous advantageous characteristics of the sensor device according to the invention are manifest even when the single filler element 17 is applied. The mechanical characteristics, such as the loadability and measuring range of these embodiments can be set to similar rates as in the case of the embodiment shown in FIG. 1A, but manufacturing of this product could be much easier than the embodiment of the FIG. 1A.

In the embodiments of the sensor device according to the invention without a light reflecting layer, the at least one filler element fills partly or even fully the space between the cover layer and the carrier element. In these embodiments, the cover layer is designed with such parameters so as to replace at least partly the function of the light reflecting layer, as detailed below. In the case of complete filling, the at least one filler element fills the space between the cover layer or light reflecting layer and the carrier element, in a way so as to surround the at least one light emitting element and the at least one light detecting element. In the completely filled embodiments comprising several filler elements, the said filler elements fill up the inner space of the sensor device.

The light emitted by the light emitting element 20 is projected in the sensor device in accordance with the laws of light refraction and light reflection. In the present embodiment, the light emitting element 20 is surrounded by a directing element 21 regulating the lateral scatter of the light of the light emitting element 20, i.e. having an optical blocking function. In this embodiment, the sensor device has three light detecting elements 22 which are arranged around the single light emitting element, and the said light detecting elements 22 are arranged at the vertices of an equilateral triangle having the light emitting element 20 in its centre.

Accordingly, the carrier element 24 is covered at the top by several layers having different functions. In the present embodiment, one layer is the cover layer 12 being actually the external covering of the sensor device, reflecting the light emitted by the light emitting element 20 towards the light detecting elements 22, and preventing the ingress of external light into the sensor device. Consequently, the cover layer 12 has a double function. On the one hand, it does not let light into the sensor device from the outside, i.e. enables the light coming from the outside to be excluded from the sensor device. On the other, it does not allow escaping of the preferably infrared light emitted by the light emitting element 20 from inside the sensor device. Because of these functions, it is made of a typically black optical blocking material.

The light reflecting layer 14 arranged within the cover layer 12 is preferably made of an optically diffuse material. An optically diffuse material scatters any incident light in many directions. The function of the light reflecting layer 14 is to reflect the light of the light emitting element 20 towards the inside of the sensor device, i.e. towards the light detecting elements 22. In such embodiments of the sensor device according to the invention which do not have a light reflecting layer, the cover layer fulfils the function of the light reflecting layer.

In the embodiment according to FIG. 1A, it is the filler element 18 and in the embodiment depicted by FIG. 1B the filler element 17 surrounds the light emitting dement 20 and the light detecting elements 22. This could be implemented by way of example through the application of appropriate filler elements 17, 18 which are matched to the light emitting element 20 and the light detecting elements 22.

Figure 3:
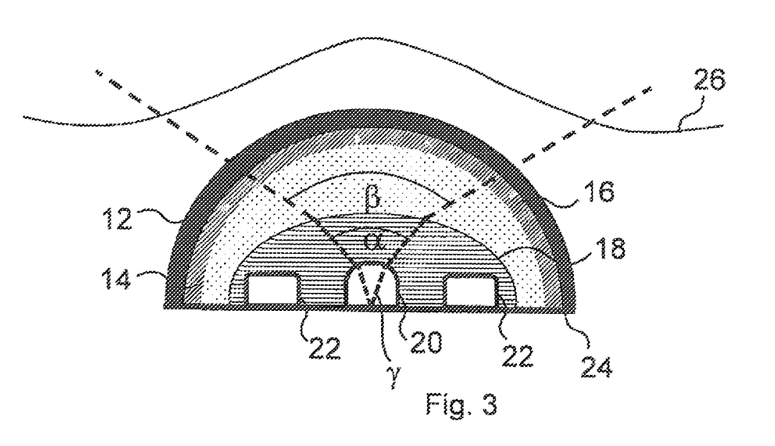
FIG. 3 is a schematic cross-sectional view of the embodiment according to FIG. 1A with the sensor range depicted.
Figure 5:
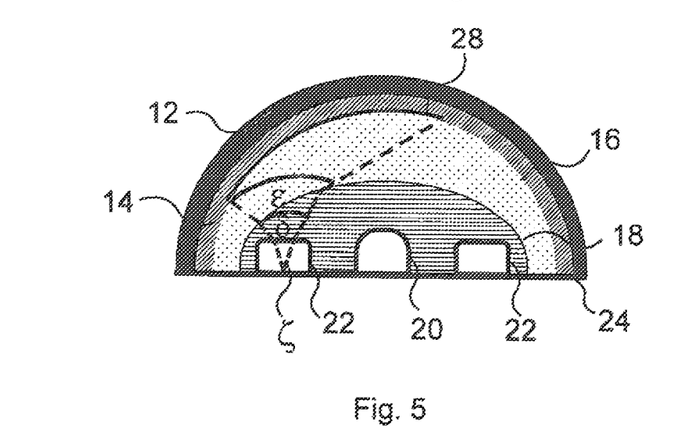
FIG. 5 is a schematic cross-sectional view of the light detecting element embodiment according to FIG. 1A, with the angle of vision depicted.

In the embodiment shown in FIG. 1A, the filler elements 16, 18 having different refractivities practically form a lens in the inner space of the sensor device. The inner space of the sensor device is confined by the cover layer or the light reflecting layer and on the opposite side of the device by the carrier element, the at least one light emitting element arranged on the carrier element, and the at least one light detecting element. It is advisable to configure the finer elements 16 and 18 having different refractivities in a way that the lens formed by them is above both the light emitting element 20 and the light detecting elements 22. It is not necessary for the light emitting element 20 to be in the focus of the so formed lens, but in case a lens is formed, the degree of lens curvature plays a significant role. The lens is used for scattering the light of the light emitting element 20 and also for collecting the light coming from the light reflecting layer 14 and the cover layer 12 confining the filler elements 16 from the opposite side respect to the filler element 18. As a result, of using the lens, on the one hand the light of the light emitting element 20 illuminates more uniformly the inside of the dome formed by the cover layer 12 and the light reflecting layer 14, and on the other hand the light detecting elements 22 sense more light as shown by FIGS. 3 and 5. By selecting an appropriate lens shape, it can be achieved that the light emitting element 20 radiates the light into a part of the space which corresponds to the largest possible vertex angle of the cone, and therefore the sensor is more sensitive to lateral pressures, too, and has a higher resolution. In this case, the light detecting elements 22 receive the reflected light beams also from a larger part of the space. In the present and in numerous other embodiments below, the sensor device comprises dome-shaped cover layer, dome-shaped light reflecting layer and at least one filler element matched thereto. In any embodiment of the invention to be described below, several filler elements having different refractivities can be applied. The use of a single filler element with a uniform refractivity in accordance with the embodiment shown in FIG. 1B is equal to having the same refractivity for the first and second filler elements in the embodiment of FIG. 1A. In the case of using a single filler element by way of example the filler element 17, the lens discussed above is not formed, but refraction may arise on the boundary of the filler element 17 and the light emitting element 20 and the light detecting elements 22, respectively, and therefore the advantages of applying the filler element as detailed in relation to FIGS. 3 and 5 are manifest to a certain extent also in the embodiment according to FIG. 1B.

The thickness of the cover layer 12, the light reflecting layer 14 and the filler elements 16, 18 can be varied depending on the material of the cover layer and also on a task-specific basis. The thickness of the layers and the filler elements influences the measuring range (i.e. compressibility) of the sensor device in addition to its physical size (height, width) and mass.

It is advisable to select the minimal thickness of the outermost layer i.e. the cover layer 12 in a way that it blocks the light of the light elements existing in the application environment in a suitable measure only. The function of the light reflecting layer 14 located within the cover layer 12 (provided that the former has a proper thickness) may be taken over also by the cover layer 12, i.e. the application of the light reflecting layer 14 is optional. The thickness of the light reflecting layer 14 is to be dimensioned in a way that it reflects a sufficient quantity of light for the measuring limit to be achieved. In general it can be said that the minimal thickness of the two layers mentioned above, i.e. the cover layer 12 and the light reflecting layer 14, can be specified subject to the desired output characteristics of the sensor device. The minimal thickness of the filler elements 16, 18 and 17, respectively, is the value where the elements are subjected to the maximal force of the envisaged measuring range, and the deformation of the filler elements 16, 17 and 18 falls into the useful part of the measuring range, and does not cause saturation in the output signal; accordingly, even if the filler elements 16, 17 and 18 are subjected to maximal deformation, a minimal distance from the light detecting element 22 required for measurement remains. The maximal thickness of the filler elements 16, 17 and 18 is determined by the minimal measuring range, so that the lowest measurable force acting on the surface of the sensor device leads to such a deformation which results in a detectable change on the output of the sensor device. A typical ratio in relation to the total thickness of the sensor device is the following: cover layer 5%, light reflecting layer 1% and filler element(s) 94%. The above considerations can be suitably applied in all embodiments of the sensor device according to the invention.

When applying filler elements made of different refractivity materials, their flexibility is to be taken preferably into consideration. If the flexibility of filler elements is equal, then each filler element is deformed to an identical extent under the impact of a given force. However, if the flexibility of a filler element is twice as much by way of example than that of the other filler element, they will be deformed in this ratio under the impacts of a given force. Accordingly, by applying filler elements that have different flexibilities, the measuring range of the sensor device can be preferably extended. For the maximal desired deformation, it is possible to use two or more filler elements where the appropriate selection of flexibility will lead practically to the deformation of one filler element in the case of a unit load, while the other or more than one other finer elements only start to be deformed practically at many times the unit load. In this way, the measuring range of the sensor device can be expanded or adjusted.

Figure 2:
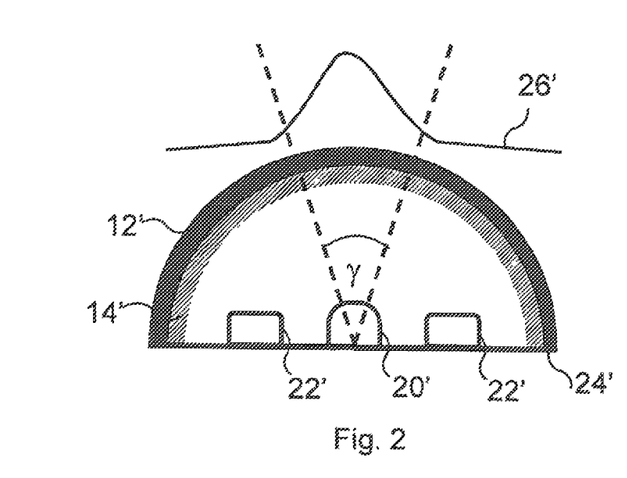
FIG. 2 is a schematic cross-sectional view of a prior art sensor' device with the sensor range depicted.

The characteristics of the lens formed by the filler elements 16 and 18 as described above are illustrated by FIGS. 2 and 3. A prior art sensor device is shown in FIG. 2. A prior art sensor device is different from the sensor device according to the invention in that there is no filler element therein between the cover layer 12' and the light reflecting layer 14' and between the light emitting element 20', the light detecting elements 22' and the carrier element 24', respectively. In this device, the light leaves the light emitting element 20' without refraction, and accordingly the light of the light emitting element 20' hits the light reflecting layer 14' at the solid angle of γ. The figure shows sensitivity curve 26' depicting sensitivity prevailing along the surface of the sensor device.

FIG. 3 is a schematic cross sectional view of an embodiment of the sensor device according to the invention. This embodiment deviates from that shown in FIG. 1A in that the directing element 21 is not arranged around the light emitting element 20 in this. By the appropriate selection of geometry and refractivity of the filler elements 16, 18, preferably a lens can be formed above the light emitting element 20 and the light detecting elements 22 as mentioned before. Similarly to FIG. 2, FIG. 3 also shows the solid angle of the light emitted by the light emitting element 20, which said light hits the light reflecting layer 14 and the cover layer 12. Similarly to the prior art sensor device, the light is generated by the light emitting element 20 at the solid angle of γ. Since the filler element 18 denser than the medium filling up the inside of the light emitting element 20 and therefore having a higher refractivity surrounds the light emitting element 20, the light leaving the light emitting element 20 is refracted on the surface of the light emitting element 20, when it enters the material of the filler element 18, and proceeds therein at the solid angle α. The filler element 16 and the filler element 18 are preferably made of a material having different refractivities, and therefore the light exiting from the filler element 18 and entering the filler element 16 is refracted again at the boundary of the filler elements 16, 18 and proceeds at the solid angle β in the filler element 16 towards the light reflecting layer 14 and the cover layer 12. By the appropriate selection of the refractivity of the applied filler elements 16, 18, the solid angles α and β illustrated in FIG. 3 and aimed at supporting the preferred functioning of the sensor device can be adjusted.

It is noted that the sensor device according to the invention can be implemented by the application of a single filler element fitted into the space confined by the carrier element and the cover layer or the light reflecting layer, but because of the double refraction of the light coming from the light emitting element 20 and the light reflected by the cover layer and/or light reflecting layer, an even more advantageous effect can be achieved by two filler elements. Accordingly, if the filler elements 16, 18 are appropriately designed, a pressure acting on a much larger surface of the cover layer 12 can be detected with high accuracy by means of a sensor device according to the invention than with a prior art sensor device as shown by sensitivity curve 26 of an appropriate embodiment of the invention and by the prior art sensitivity curve 26'. In accordance with the refractivities of the filler elements 16, 18, the size and location of the area illuminated by the light emitting element 20 may be different. Accordingly, the illuminated area can be optimised by the appropriate selection of the materials used. When FIG. 3 is compared with FIG. 2, the conclusion can be drawn that by means of the lens formed in the sensor device according to the invention, the useful surface of the sensor device suitable for detection is substantially expanded compared to the prior art. The interrelated sizes of filler elements 16, 18 are influenced by the parameters of the lens to be formed. The most important consideration in making the lens is that the light detecting elements 22 should fall into the collection range of the lens. Furthermore, the filler elements 16, 18 may also be made of a material of a preferably different hardness. In case the filler element 18 is made of a harder material, the filler element 18 is less deformed than the filler element 16 when pressure is applied, and the lens formed keeps its shape better. In this case, by increasing the pressure, first the external filler element 16 is deformed, and then in the case of a larger impact, the inner filler element 18. It is noted that for certain applications such an embodiment may also be beneficial, where only the filler element 18 is applied and not the filler element 16. The space that would be otherwise needed for fitting the filler element 16 can be filled up by air or a different gas by way of example. In such embodiments, only the light refraction effect of the filler element is utilised.

Figure 4:
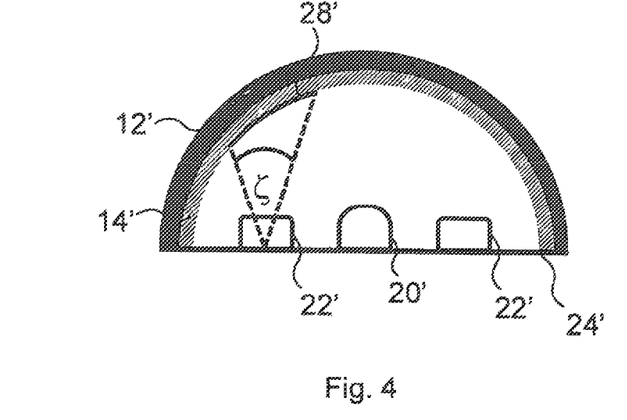
FIG. 4 is the light detecting element of the prior art sensor device according o FIG. 2, with the angle of vision depicted.

FIGS. 4 and 5 show the comparison of the angle of vision (angle of half intensity) of the light detecting elements 22' applied in prior art sensor devices and the angle of vision of the light detecting elements 22 according to an embodiment of the invention. In the prior art sensor device, the light detecting element 22' has angle of vision $\zeta$, but lacking the use of a filler element, the light beams are not refracted even on the surface of the light detecting element 22'. The prior art sensor device has a detection range 28' in accordance with the angle of vision $\zeta$.

FIG. 5 is a schematic cross-sectional view of the angle of vision of the light detecting element 22 in the embodiment of FIG. 3. In this embodiment, the light is refracted at the boundary of the filler elements 16 and 18, and also at the boundary of the filler element 18 and the light detecting elements 22. Accordingly, inside the light detecting element 22, the light that can be characterised by the angle of vision $\zeta$ has an angle of vision $\delta$ in the filler element 18, and an angle of vision $\epsilon$ in the filler element 16. If the filler elements 16 and 18 are appropriately designed, the detection range 28 defined by the angle of vision $\epsilon$ is much larger than the detection range 28' of the prior art sensor device shown in FIG. 4. Similarly to the area illuminated by the light emitting element 20, corresponding to the lens formed by the filler elements 16 and 18 made of materials that have different refractivities, the size of the collection area of the light detecting elements 22, i.e. the size of such area can be varied from which the reflected components of the light radiated by the light emitting element 20 are collected.

Figure 6:
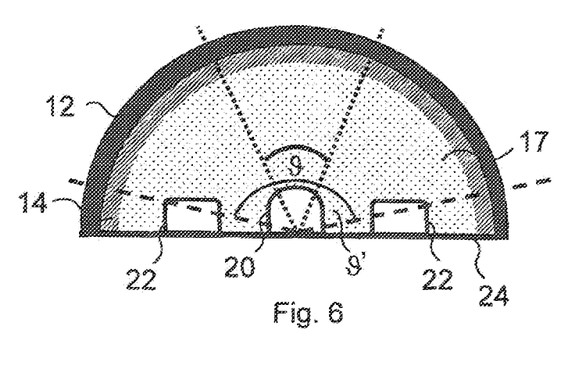
FIG. 6 is a cross-sectional view of an embodiment of the invention, showing the angle of vision of its light emitting element and an extended angle of vision.
Figure 7:
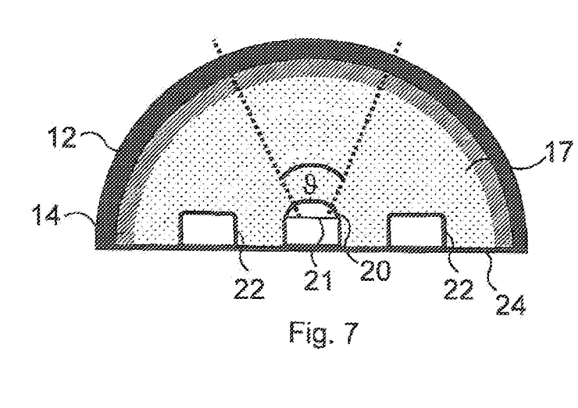
FIG. 7 is a cross-sectional view of the embodiment according to FIG. 1B, depicting the angle of vision of its light emitting element fitted with a directing element.

In FIGS. 2 and 3, $\gamma$ indicates the solid angle in which the light emitting element emits at least 50% of its intensity. The rest of the intensity is radiated in the remaining angle range. This phenomenon is illustrated by FIG. 6, where an embodiment similar to that of FIG. 1B is shown, and it differs therefrom in that the directing element 21 is omitted. In FIGS. 6 and 7 the light refraction at the boundary of the light emitting element 20 and the filler element 17 is not shown. In FIGS. 6 and 7, $\theta$ indicates the solid angle at which the light emitting element 20 provides approx. 50% of its intensity, and $\theta'$ depicts the solid angle at which practically the full intensity is exerted. It can be observed that in the arrangement according to FIG. 6, some light from the light emitting element 20 directly reaches the light detecting elements 22, which distorts the measurement by causing an offset. To avoid this effect, the directing element 21 can be applied. The embodiment shown in FIG. 7 differs from the embodiment of FIG. 6 in that it has the directing element 21. The directing element 21 physically prevents the light emitting element 20 from radiating in a larger than a given solid angle. Consequently, the application of the directing element 21 leads to a more favourable solution than the prior art approaches, because it prevents the light from reaching the light detecting elements 22 directly from the light emitting element 20 as this would cause an offset. Accordingly, the directing element 21 preferably shields the light emitting element 20 at least up to the height of the light detecting elements 22.

With the common application of the at least one filler element and the directing element, in certain embodiments of the sensor device according to the invention, as a result of the light refraction(s) detailed above, the sensitive surface of the sensor device is expanded substantially in relation to the prior art solutions, in a way that, meanwhile, by means of the directing element arranged around the light emitting element, the lower intensity light beams, having less of a relevance from the aspect of the measurement, leaving the light emitting element at a large solid angle are prevented from directly reaching the light detecting elements.

Figure 8:
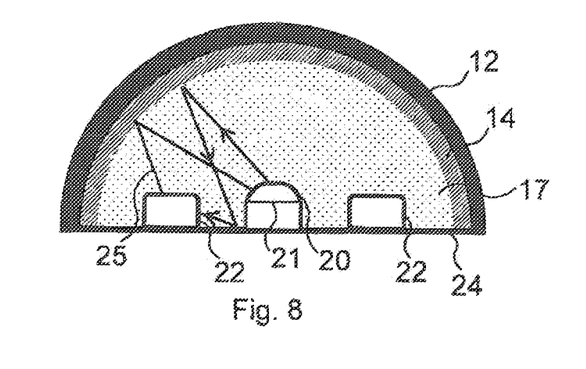
FIG. 8 is a cross-sectional view of the embodiment according to FIG. 1B illustrating exemplary paths of light beams directed to the light detecting element from the light emitting element surrounded by directing element.
Figure 9:
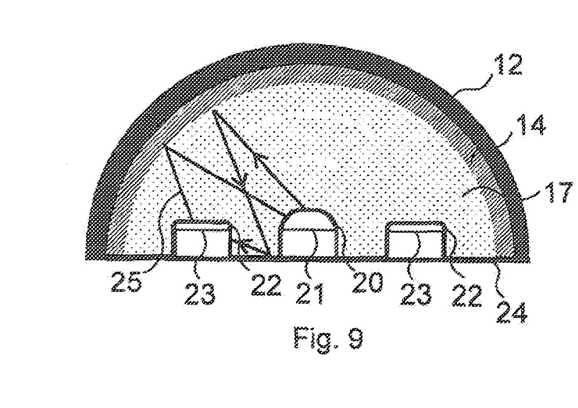
FIG. 9 is a view of paths of light beams, according to FIG. 8 in an embodiment, in which light detecting elements are also surrounded by directing element.

The screening of light beams causing an offset is further improved in the embodiment of FIG. 9 compared to the embodiment shown in FIG. 7. FIG. 8 shows that the light beams leaving the light emitting element 20 and reflected by the light reflecting layer 14 can reach the light detecting elements 22 also reflected from the carrier element 24. This phenomenon, similarly to the situation shown in FIG. 6, causes offset in the measure. This effect can be avoided by using directing elements 23 arranged around the light detecting elements 22 as shown in FIG. 9. The directing element 23 shown in FIG. 9 prevents the light beams reflected from the carrier element 24 from getting into the light detecting element 22, and facilitates restriction to those light beams which are reflected by the light reflecting layer or in certain embodiments by the cover layer.

The application of the directing elements 21 and/or 23 is especially advantageous, because an offset distorting the measuring results has a further detrimental impact also. The light detecting elements applied in practice are sensitive in most cases to the so-called saturation. Saturation means that the light detecting elements are not able to measure intensity higher than a given value, and after saturation, they are pushed out of the measuring range, i.e. they can only receive and measure the light in a limited quantity. Another additional effect is that dose to saturation, the light detecting elements are able to measure with a lower accuracy only. Therefore, the problems related to saturation can be significantly reduced by decreasing the offset according to the above description, by the use of directing element(s). By reducing the offset, the saturation of light detecting elements can be advantageously avoided, and the measurement can be moved away from the saturation and very small changes in intensity becoming sensible.

Figure 10:
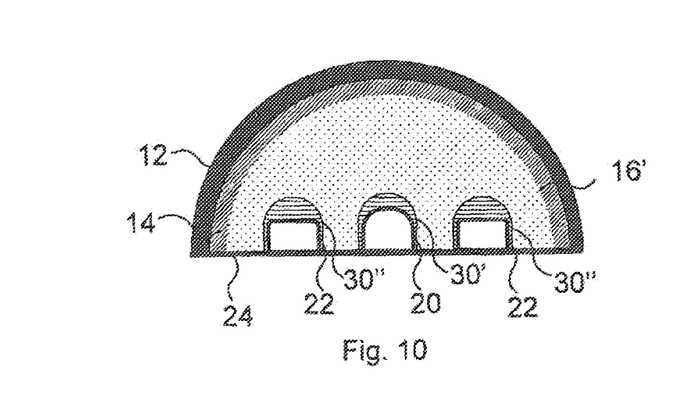
FIG. 10 is a schematic cross-sectional view of a further embodiment of the sensor device according to the invention.

In the embodiment shown in FIG. 10, similarly to the embodiment illustrated in FIG. 1A, lens(es) is (are) formed by means of filler elements in the space between the light reflecting layer 14 and the carrier element 24. In the embodiment shown in FIG. 10, the lens is formed by filler element 30' arranged on the light emitting element 20, filler elements 30" arranged on the light detecting elements 22, and filler element 16' filling up the rest of the inner space of the sensor device. In this embodiment, the filler elements 30', 30" having refractivity different from that of the filler element 16' are directly fitted on the surface of the light emitting element 20 and the light detecting elements 22, i.e. these are local lenses. By applying force or pressure to the cover layer 12, lenses formed by filler elements 30', 30" are only deformed to a very small extent, and therefore, preferably even in the case of a relatively large deformation of the sensor device, providing appropriate refraction. Contrary to the use of filler element 18 representing one common lens, the use of the filler elements 30', 30" is also advantageous, because with an appropriate configuration thereof, the path of the light beam can be tuned to and formed separately for the light emitting element 20 and the light detecting element 22.

Therefore, in the embodiment shown in FIG. 10, by the application of the filler elements 30', 30" having preferably refractivity other than that of the material of the filler element 16', lenses can be formed in various parts of space in the inner space of the sensor device. Lenses may also be formed by using filler elements of a shape other than that of filler elements 30', 30"; in these cases again the remaining inner space of the sensor device is preferably filled with a material having different refractivity, but it is conceivable that an embodiment with favourable characteristics can be obtained without the application of a further filler element, i.e. when the remaining space is filled up with air or another gas. By means of the lenses formed by the filler elements, the sensor device may have non-linear characteristics, and by means of a lens formed below a given section of the surface of the cover layer, increasing of the sensitivity of the sensor device can be achieved for the given surface part as well. The application of the embodiment according to FIG. 10 is especially advantageous, if a sensor device having predetermined characteristics is to be produced.

It is noted that in the forming of lenses, for establishing of the appropriate light paths, only the differences between the refractivities of the materials of the two types of finer elements are used.

Figure 11:
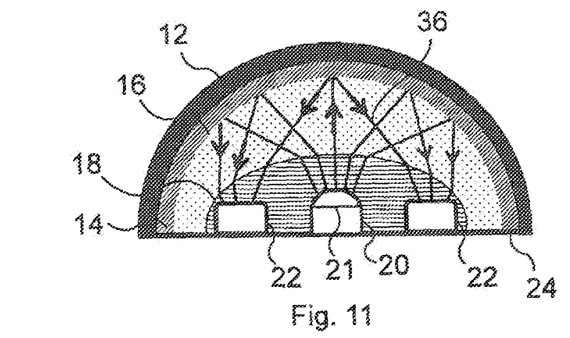
FIG. 11 is a schematic cross-sectional view of the embodiment according to FIG. 1A, showing paths of light beams of the light emitting element of the sensor device.

FIG. 11 shows the embodiment of FIGS. 3 and 5 by illustrating a path of light beam 36 by way of example setting out from the light emitting element 20. The beams radiated from the light emitting element 20 reach at relatively distant points from each other the inner surface of the light reflecting layer 14 due to the light refraction at the boundary of the filler elements 16 and 18. After being reflected by the light reflecting layer 14, the light beams are again refracted at the boundary of the filler elements 16 and 18, and thus reach the light detecting elements 22. FIG. 11 only shows such exemplary light beams, which, as a result of reflection, reach the light detecting elements 22 directly from the light emitting element 20.

Figure 12:
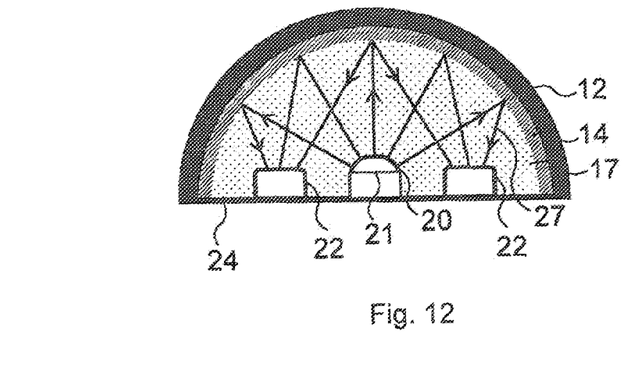
FIG. 12 is a schematic cross-sectional view of the embodiment according to FIG. 1B, showing paths of light beams of the light emitting element of the sensor device.

FIG. 12 is a cross-sectional view of the embodiment fitted with a filler element 17. The figure depicts a path of light beam 27 reaching the light detecting elements 22 directly from the light emitting element 20, and differing from the path of light beam 36 shown in FIG. 11, it is only refracted at the boundary of the light emitting element 20 and the filler element 17.

Figure 13:
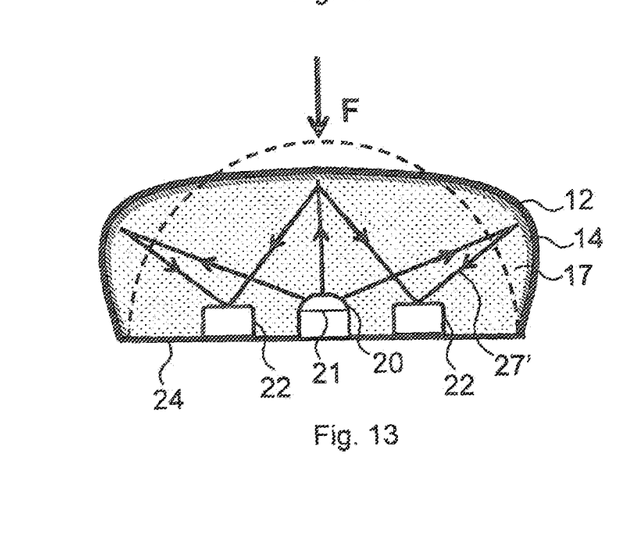
FIG. 13 shows the deformation of the sensor device according to FIG. 1B under impact of force.

FIG. 13 is a schematic cross-sectional view of the deformation of the sensor device according to the invention under the impact of a force regarding an embodiment very similar to that shown in FIG. 12. The embodiment shown in FIG. 13 only differs in the thickness of the cover layer 12 and the light reflecting layer 14. FIG. 13 illustrates that the thickness of the layers can be freely selected depending on a given application.

In FIG. 13, the original dimension of the sensor device associated with the no force condition is depicted by a dashed line. Under the impact of force F applied to the surface of the sensor device, the cover layer 12, the light reflecting layer 14 and the filler element 17 become deformed as well. The deformation of the light reflecting layer 14 changes the path of light beam 27 shown in FIG. 12 to path of light beam 27'. In the status of the embodiment of the sensor device according to the invention without force shown as a schematic cross-sectional view by way example in FIG. 12, and in the status subjected to a force as shown in FIG. 13, various quantities of light reach each light detecting element 22 from the light emitting element 20. It is advantageous to locate the light detecting elements 22 in an ordered way, e.g. in the way shown in FIG. 1B at the three vertices of an equilateral triangle. In this case, in the resting status of the sensor device, practically equal quantity of light reaches each light detecting element 22 from the light emitting element 20. In the status subjected to force as shown in FIG. 13, this equilibrium is upset, and as a result of changing of light paths, depending on the magnitude and direction of force F, each light detecting element 22 is exposed to different quantity of light, i.e. the quantity of light differs from the status without force. When the sensor device is appropriately calibrated, a conclusion can be drawn from the light quantities measured by means of the light detecting elements 22 about the magnitude and direction of force F. For determining the magnitude and direction of force F, the application of at least three light detecting elements 22 and at least one light emitting element 20 is necessary.

In certain embodiments, the device according to the invention comprises filler element(s) made of a flexible, but incompressible material. In these embodiments, the material of the filler element(s) is flexible but incompressible, i.e. it does not change its volume as a result of elastic deformation. Unchanged volume means that it changes to a negligible extent, like the volume of fluids under the impact of compression or the volume only changes under the impact of especially strong forces which well exceed the measuring range of the sensor device.

FIG. 13 shows the deformation of sensor device filled up with incompressible material, under the impact of force F. As a result of its incompressibility, the filler element is deformed according to the figure, i.e. due to the force acting in the centre of the dome, the dome bulges round. The figure illustrates that as a result of this deformation, the paths of light beams 27' change substantially in comparison with the paths of light beams 27, and therefore with the significant change of the paths of light beams, the quantity of light getting into each light detecting element 22 also differs considerably from the one detected in a condition without force. Therefore, by the application of an incompressible filler element, the sensitivity of the sensor device is improved.

The force is measured according to the following. The light emitting element 20, e.g. an infrared LED, located in the centre of the carrier element 24 representing the bottom confining unit of the sensor device, illuminates the light reflecting layer 14 through the filler element 17, and the intensity of light reflected by the light reflecting layer 14 is measured by the light detecting elements 22. Under impact of an external force, the shape of the flexible cover layer 12, i.e. the form of the outer dome, changes and the light quantity reflected to each light detecting element 22 varies subject to the deformation of the dome, and from this alteration, the magnitude and direction of the exerted force can be determined.

Figures 14, 15, 16A, 16B, 16C:
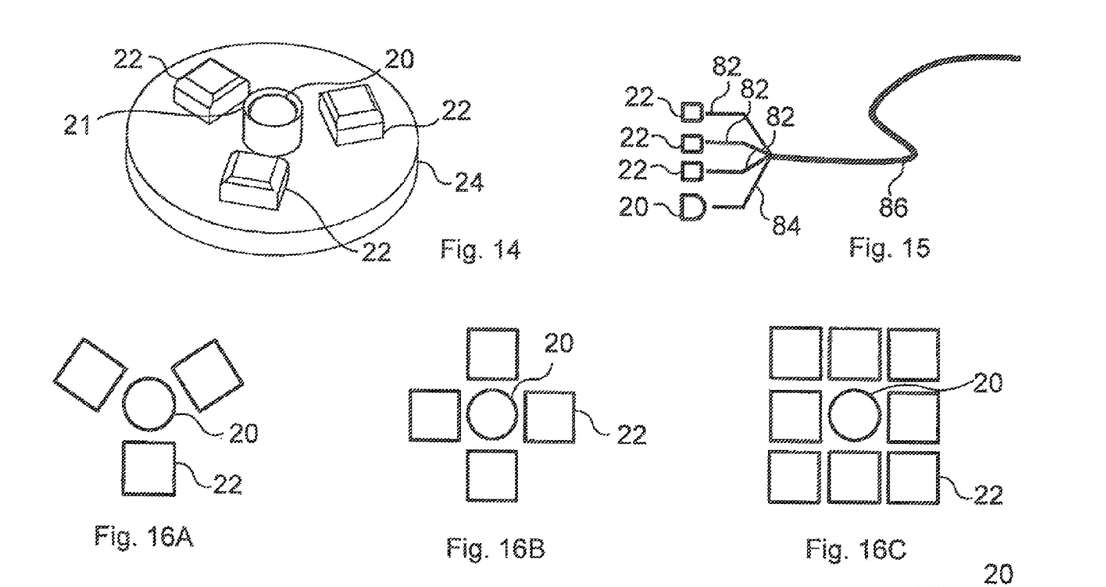
FIG. 14 is a spatial drawing of the layout of a light emitting element and light detecting elements according to an embodiment of the invention.
FIG. 15 is a drawing depicting the optical cabling connected to the light element and light detecting elements of the sensor device according to the invention.
FIGS. 16A-16G are drawings illustrating in various embodiments the layout of the sensor device light emitting elements and light detecting element of the sensor device according to the invention.

FIG. 14 shows one detail of the embodiments of the sensor device according to the invention as shown in FIGS. 1A and 1B: the light emitting element 20 and the light detecting elements 22 arranged on the carrier element 24. However, on the circular carrier element 24, the light emitting element(s) 20 and the light detecting element(s) 22 can be arranged in an order different from that shown in FIG. 14.

FIG. 15 illustrates that optical cables 84 and 82 are applied for transmitting the light to the light emitting element 20 and from the light detecting elements 22 collecting the reflected light, i.e. the electronic part of the sensor device is not arranged on the sensor device proper. The optical cables 82, 84 can be joined in a bundle 86. It is advisable to arrange the optical cables 82, 84 in accordance with the light emitting elements 20 and the light detecting elements 22 of the sensor device.

FIGS. 16A to 16G show various exemplary arrangements of the light emitting element(s) 20 and the light detecting element(s) 22. In addition to those illustrated, other arrangements may also be conceived. In the case of each arrangement, the sensor device must be calibrated in order to make it suitable for measuring force and pressure.

FIG. 16A illustrates arrangement of the light emitting element 20 and the light detecting elements 22 as already shown in FIGS. 1A, 1B and 14. In FIGS. 16B and 16C, similarly to FIG. 16A, the light detecting elements 22 are arranged in an ordered form around the central light emitting element 20. In FIG. 16B and FIG. 16C there are four and eight light detecting elements 22, respectively, around the light emitting element 20. By means of the arrangement of FIG. 16B, the independent components of the force can be directly determined, and therefore being obtainable more simply than in the arrangement of FIG. 16A, because each light detecting element 22 is arranged at 90° around the light emitting element 20. A further advantage of the arrangement shown in FIG. 16C as against the arrangement in FIG. 16B is that it can be used for achieving a further direction selectivity, i.e. through the use of further light detecting elements 22, an even more accurate result than that accomplished with the arrangement of FIG. 16B can be attained.

Figure 16D:
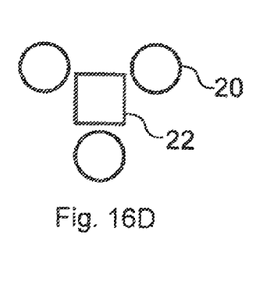
Figure 16E:
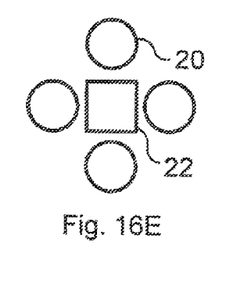
Figure 16F:
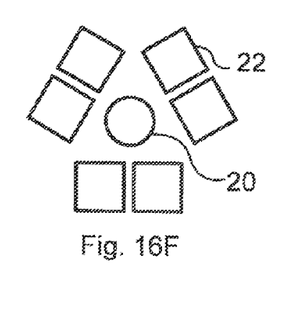
Figure 16G:
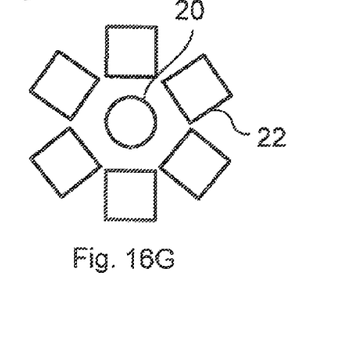

Contrary to the embodiments presented so far, FIG. 16D comprises more from light emitting elements 20, in the present embodiment three, while in the present embodiment of the sensor device, one light detecting element 22 is arranged centrally on the carrier element 24. FIG. 16E shows a similar arrangement to FIG. 16D, with the difference that in this embodiment four light emitting elements 20 surround the light detecting element 22 in an orderly manner, contrary to the three shown in FIG. 16D. By means of the arrangements depicted by FIGS. 16D and 16E, two types of functions can be implemented by way of example. As in these embodiments a single light detecting element 22 is arranged, when the light emitting elements 20 emitting the same wavelength of light are applied, these embodiments are able to detect preferably the change in light intensity as measured compared to the condition without force. In the case of using the light emitting elements 20 emitting light of various wavelengths and by applying the light detecting element 22 being able to detect selectively the light intensities corresponding to these wavelengths, these embodiments can be suitable also for determining the magnitude and direction of pressure force. In the embodiment shown in FIG. 16F, again one centrally located light emitting element 20 is arranged, surrounded by six light detecting elements 22 in an order differing from that described above. FIG. 16G illustrates a similar arrangement of the light emitting elements 20 and the light detecting elements 22 than the arrangement of FIG. 16F. The six light detecting elements 22 according to FIG. 16G are arranged in an orderly manner in this embodiment around the light emitting element 20. In addition to the arrangements of the light emitting elements 20 and the light detecting elements 22 presented by way of example, many favourable arrangements are conceivable.

Figure 17:
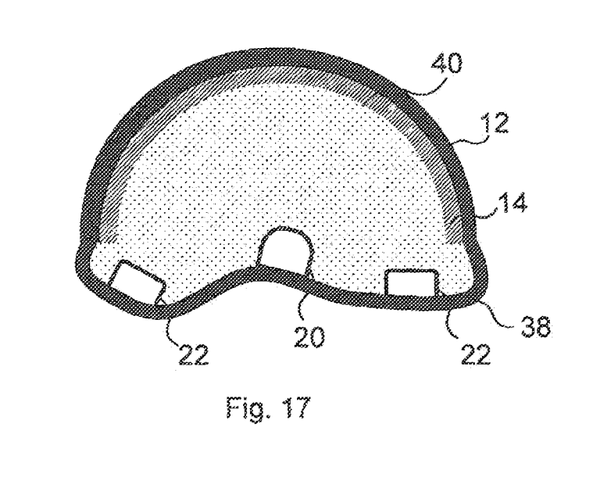
FIG. 17 is a schematic cross-sectional view depicting a further embodiment of the sensor device according to the invention.

FIG. 17 shows such an embodiment, in which the light emitting element 20 and the light detecting element 22 are arranged on an irregular shape, i.e. not flat like in the embodiments shown above, but an arbitrary shape, carrier element 38. Because of the calibration, actually the application of an arbitrary shape carrier element 38 is conceivable, i.e. the sensor device can be designed in a way that it is matched to an arbitrarily shaped surface. This substantially extends the application possibilities of the sensor device. The present embodiment comprises a filler element 40, but the use of two filler elements having different refractivities can also be conceived in an embodiment which is different only in the design of the filler elements from the present one.

Figure 18:
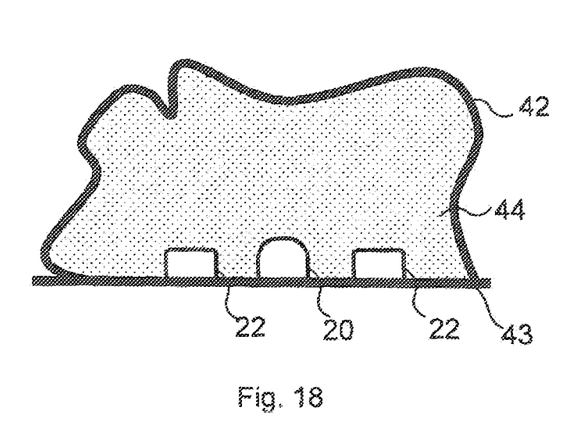
FIG. 18 is a schematic cross-sectional view depicting a yet further embodiment of the sensor device according to the invention.

FIG. 18 illustrates a further embodiment. In this embodiment, the light emitting element 20 and the light detecting elements 22 are arranged on a flat carrier element 43, but instead of the practically normal cover layer 12, an amorphous shape cover layer 42 is applied. In the present embodiment a filler element 44 is used, with a shape matched to the cover layer 42. In this embodiment, no light reflecting layer is arranged between the cover layer 42 and the filler element 44.

Therefore, according to FIGS. 17 and 18, the light emitting element(s) 20 and the light detecting element(s) 22 can also be arranged on a carrier element 38 having a flexible or amorphous shape. Such amorphous configurations may be applied especially advantageously in such robot hands or prosthesis, where the various pressure sensor areas, for example, the fingertip, are not of a semi-global shape and it is beneficial if the sensor device is shaped as a kind of finger. In such a way, for example, when a hand is configured, the pressure can be detected with a single sensor device in a more extended area.

In the case of embodiments similar to that depicted in FIG. 18, if the cover layer 42 is of a concave design, the reflection characteristics of the light beams coming from the light emitting element 20 may even be very special. This may even lead preferably to a configuration, in which the given embodiment of the sensor device is more sensitive to the pressure applied in a given part of the space.

Figure 19:
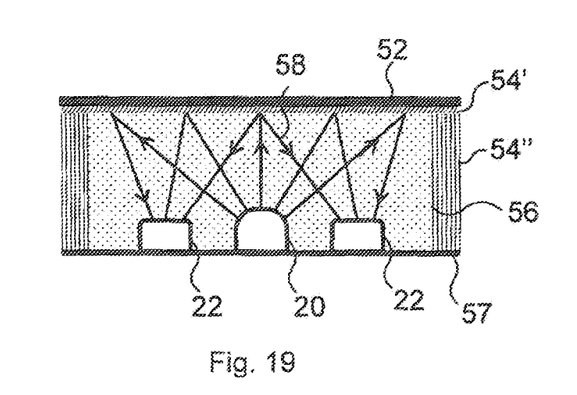
FIG. 19 is a schematic cross-sectional view depicting a yet further embodiment of the sensor device according to the invention.

FIG. 19 is a schematic cross-sectional view of a further embodiment of the sensor device according to the invention. In this embodiment, the sensor device comprises, in addition to the light emitting element 20 and the light detecting elements 22, a cover layer 52, a light reflecting layer 54', an appropriately stiff and light reflecting side wall 54", a filler element 56 and a carrier element 57. The embodiment shown in a schematic cross-sectional view may have a cylindrical design, but it may also have a square prism design. The components of force F acting on the cove, layer 52 of the sensor device can also be determined in this embodiment from the light intensities detected by the light detecting elements 22. By applying the present embodiment of the sensor device according to the invention, preferably sound pressure can be measured in a medium, even in water, because in this case low-pass filter type of phenomena arising time to time in the case of other sensor devices do not occur on the thin oval of the sensor device.

Figure 20A:
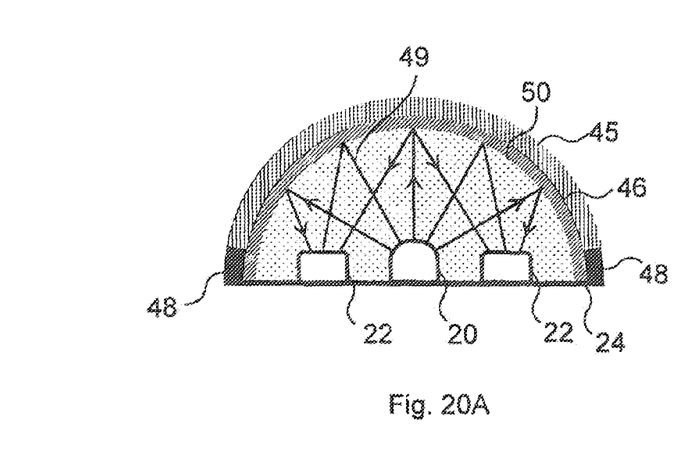
FIG. 20A is a schematic cross-sectional view depicting an embodiment of sensor device according to the invention.

FIG. 20A depicts a further embodiment of the sensor device according to the invention. In this embodiment, the sensor device comprises a stiff cover layer 45, confined by a light reflecting layer 46 on its inner side. The light is reflected in a diffuse way from the cover layer 45 and the light reflecting layer 46, respectively, similarly to the other embodiments. A filler element 50 is located within the light reflecting layer 46. The light reflecting layer 46 and the filler element 50 have flexible characteristics, but the cover layer 45 is stiff. In this embodiment, the sensing of the forces is enabled by flexible ring 48 fitted all around. Therefore, the stiff cover layer means that contrary to the embodiments above, the cover layer is of such hardness that under the impact of forces to which the cover layer is exposed, it is practically not deformed, but the deformation is transferred to the flexible ring 48.

Figure 20B:
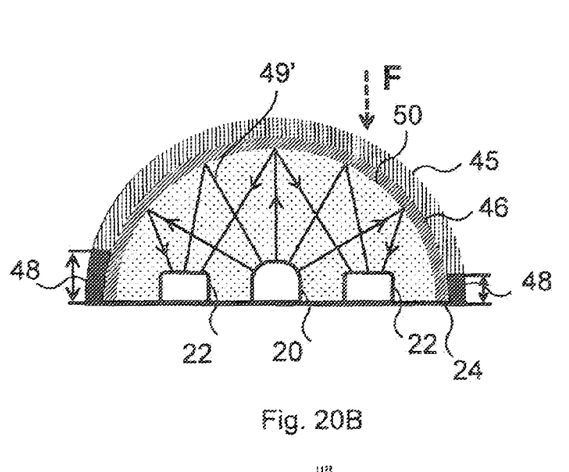
FIG. 20B illustrates the deformed status of the embodiment in FIG. 20A, under impact of force.

In a way shown in FIG. 20B, under the impact of force F, the various sections of the ring 48 are distorted to different extents on the periphery of the sensor device. This is shown in the schematic cross-sectional view of FIG. 20B in a way that the ring 48 is compressed on the right hand side of the sensor device as shown in the figure, and on the left hand side as depicted by the figure it is expanded under the impact of the applied force F. Path of light beam 49 according to FIG. 20A is turned into path of light beam 49' as a result of the deformation of the sensor device under the impact of force F. With appropriate calibration, similarly to the embodiment having a flexible cover layer, the components of force F acting on the stiff cover layer 45 can be determined from the intensity of light coming from the light emitting element 20 and arriving at the light detecting elements 22. Consequently, determining the forces acting on the cover layer 45 is based also in this embodiment on the fact that when subjected to a force, a different quantity of light reaches the light detecting elements 22 than in a state without force.

The embodiment shown in FIG. 20A is especially preferable due to its high mechanical stability offered by the application of the stiff cover layer 45. In this embodiment, the spring effect coming from the application of the flexible cover layer 12, 42 is reduced. Therefore, in this case, not the deformation of the cover layer is measured like in the embodiments described above, but the displacement of the stiff cover layer 45, indirectly the deformation of the flexible ring 48.

It is preferred to cover the stiff cover layer 45 with a further flexible, preferably thin, layer, with the main function of reducing slip on the surface of the sensor device. The measuring range of this embodiment can be adjusted with the dimensions and material characteristics of the flexible ring 48. The cover layer 45 determines the physical size of the sensor device and the size of the surface in contact with the ring 48.

Figure 21:
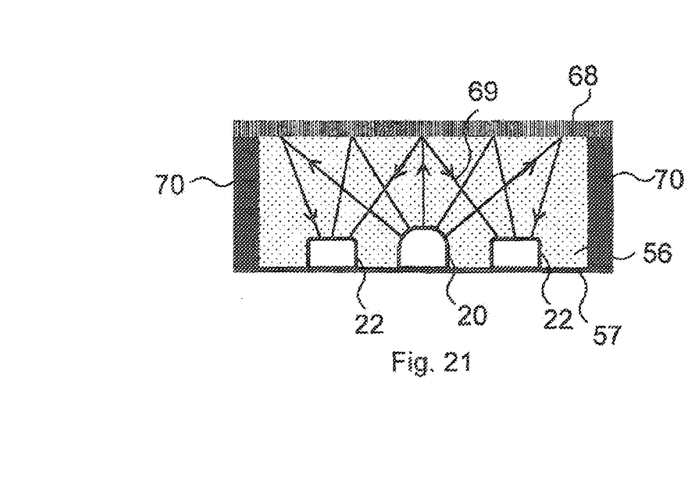
FIG. 21 is a schematic cross-sectional view depicting a further embodiment of the sensor device according to the invention.

FIG. 21 shows a further embodiment of the sensor device according to the invention. In this embodiment, compared to the embodiment shown in FIG. 19, the roles of the confining units of the sensor device are exchanged. This is because the present embodiment comprises a stiff cover layer 68 and a flexible ring 70 serving as a side wall. In this embodiment, similarly to the embodiment introduced in FIG. 20A, the deformation of the flexible ring 70 is measured. When subjected to force, by means of the light detecting elements 22, the change in intensity in relation to the state without force is measured, and from this a conclusion can be drawn about the magnitude and direction of force F. In this embodiment, practically the tilting angle of the cover sheet, i.e. that of the cover layer 68 can be determined.

Figure 22:
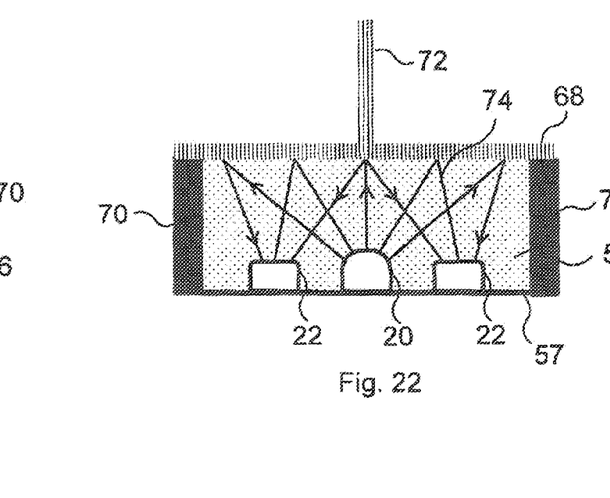
FIG. 22 is a schematic cross-sectional view depicting a yet further embodiment of the sensor device according to the invention.

FIG. 22 shows an embodiment similar to that of FIG. 21. In this embodiment, a stiff protruding object 72 is fixed substantially perpendicularly to the cover layer 68. In this embodiment, preferably it is not the stiff cover layer 68 which is subjected to force F, but the protruding object 72. As a result of applying force F to the object 72, the flexible ring 70 is deformed. The embodiment shown in FIG. 22 can be generalised: a stiff protruding object can be fixed in any orientation to the stiff cover layer 68. The advantage of this embodiment is that when configured in an appropriate size, it could have a deformation of even a centimetre magnitude. The embodiment depicted by FIG. 22 may be used advantageously for measuring the force of wind or flow.

The embodiments shown in FIGS. 20A, 21 and 22 can be implemented also by using in these embodiments the protrusion of filler element 50, 56 instead of the flexible ring 48, 70, in a way that it takes over the role of the flexible ring 48, 70 by coupling the cover layers 44, 68 to the carrier elements 24, 57 and as a result of the force acting on the cover layers 44, 68 it is subjected to elastic deformation. In this case, those parts of the appropriately designed filler element which are associated with the pressure sensor surface are preferably coated with a light blocking material, black silicone by way of example, so that also this part of the sensor device blocks the light of the light emitting element 20 and the light beams coming from outside the sensor device. The providing of the coating can be avoided in case the disturbing light beams coming from the outside are prevented in a different way from reaching the light detecting elements 22.

The embodiments depicted in FIGS. 20A, 21 and 22 can also be made with non-rigid cover units characterised by a much higher coefficient of elasticity than that of the filler elements. The advantage of this design instead of a stiff design is that, a more flexible structure is obtained, which, is rather more similar to the embodiments having a stiff cover unit, by means of which for example the gripping of objects can be implemented easier, and when measuring the deformation occurring as a result of a force, the compression of the filler element dominates in comparison with the compression of the cover unit.

In the embodiments shown in FIGS. 19, 21 and 22, the sensor device comprises flat cover layers 52, 68 and at least one filler element 56 which has a shape matched to the former. In some of these embodiments, the sensor device has a flat light reflecting layer 54', 66 being of a shape matched to that of the filler element 56.

In many embodiments of the sensor device according to the invention comprises a flexible cover layer 12, 42, 52. In certain embodiments, the sensor device comprises a light reflecting layer 14, 46, 54' arranged below the flexible cover layer 12, 42, 52. The sensor device according to the invention furthermore comprises below the flexible cover layer 12, 42, 52 and the optional light reflecting layer 14, 46, 54' according to the description above at least one transparent, flexible filler element 16, 16', 18, 30', 30", 40, 44, 50, 56. Thanks to this special layered design, the dimensions and measuring range of the sensor device can be varied within broad limits, and by means of the cover layer 12, 42, 52 and the optionally used light reflecting layer 14, 46, 54', the effects of external illumination can be eliminated. In addition, the layered design also provides mechanical protection for the sensor device and the cover layer increases also the stability of the grip. By expanding the contact surface of the sensor device, i.e. by increasing the size of the components of the layered structure, a more uniform distribution of the force acting on the object can be achieved.

The physical sizes of the sensor device according to the invention are determined by the dimensions of cover layer, and the applied light detecting elements and light emitting elements. The size of the sensor device can even be reduced to a millimetre magnitude by applying the currently widely used up-to-date silicone integrated or surface mounted infrared LEDs and photodiodes. Accordingly, the dimensions of the sensor device can be well-adapted to given applications, and to designing a sensor field, even an artificial skin, based on the sensor devices.

It is an important function of the filler element(s) completely filling up the inner space of the sensor device and applied in certain embodiments of the sensor device according to the invention to strengthen the mechanical structure of the sensor device, and in addition their application facilitates expanding the measuring limit of the sensor device and the mechanical protection of the sensor device. The mechanical structure of the sensor device according to the invention enables a high accuracy pressure measurement in the largest part of its surface designed for sensing, and ensures determining the application point of the pressure force acting on the sensor device. The simple design of the sensor device enables the use of a minimal number of wires (earth, supply voltage, drive of the light emitting element, signal of the light detecting elements), the number of which can be reduced by locating the processing electronics to the sensor device or by organising the sensor devices in an array.

In the amorphous embodiments shown in FIGS. 17 and 18, the components of the force can be preferably determined by measuring and applying calibration functions.

It is an important characteristic of the sensor device according to the invention that the filler element(s) is (are) made from a solid flexible material, e.g. from silicone. This is because in the case of using a gas filling, any small gaps would result in gas escaping from the inner space under compression, and then with the discontinuing of the applied force, it would flow back through the same gap. This would make it substantially slower to regain the original shape of the flexible cover layer, i.e. it would decrease the dynamic behaviour oaf the sensor device. In the case of a liquid filling, the gap formation and leakage resulting from the stronger forces and the leakage would make the sensor device unsuitable for use.

A further advantage of using a flexible material filler element is that it enables the forming of a sensor device characterised by less than 1 cm dimensions, retaining the large sensing range, which without the filler element would not be feasible with the electronic components currently marketed. This is because in this size range the cover layer should be thin (but it must fall within a millimetre magnitude, because a minimal distance is required for the appropriate reflection of light), which is heavily deformed even under the impact of a small force when made of silicone without the application of a filler element. Therefore, such well-known sensor devices are sensitive, but only in a small range. Because of the filler element, the thickness of the deforming layer is increased, and therefore the sensor range can be substantially expanded.

A further advantage of using filler element is that due to its refractivity other than that of the transparent casing material of light detecting elements and light emitting elements, the filler element forms a lens around the units. As a result, the light emitting element, e.g. an infrared LED, illuminates better, more uniformly and in a larger range the inner surface of the cover layer and optionally the light reflecting layer, and the light detecting elements detect light scattered from a larger area. Consequently, the application of a filler element increases the sensitivity of the sensor device.

The invention is, of course, not limited to the preferred embodiments described in details above, but further variants, modifications and developments are possible within the scope of protection determined by the claims.

The invention claimed is:

1. A sensor device comprising
a carrier element (24, 38, 43, 57),
at least one light emitting element (20) arranged on the carrier element (24, 38, 43, 57),
at least one light detecting element (22) arranged on the carrier element (24, 38, 43, 57), and
a cover layer (12, 42, 45, 52, 68) reflecting at least one part of the light emitted by the light emitting element (20) to the at least one light detecting element, characterised by
further comprising a first filler element (16, 16') arranged between a second filler element (18, 30', 30") and the cover layer (12, 42, 45, 52, 68),
wherein the second filler element (18, 30', 30") surrounds the at least one light emitting element (20) and the at least one light detecting element (22), and the first filler element (16, 16') and the second filler element (18, 30', 30") have different refractivities, said filler elements (16, 16', 18, 30', 30") being transparent, said filler elements (16, 16', 18, 30', 30") filling at least partly the space between the carrier element (24, 38, 43, 57) and the cover layer (12, 42, 45, 52, 68), and said filler elements (16, 16', 18, 30', 30") being made of flexible materials.

2. The device according to claim 1, characterised in that a common second filler element (18) is arranged for the at least one light emitting element (20) and the at least one light detecting element (22).

3. The device according to claim 1, characterised in that separate second filler elements (30', 30") are arranged for the at least one light emitting element (20) and the at least one light detecting element (22).

4. The device according to claim 1, characterised in that the filler elements (16, 16', 18, 30', 30") are made of an incompressible material.

5. The device according to claim 1, characterised in that a directing element (21, 23) is arranged around the at least one light emitting element (20) and/or the at least one light detecting element (22).

6. The device according to claim 1, characterised in that an optical cable is connected to the at least one light emitting element (20) and/or the at least one light detecting element (22).

7. The device according to claim 1, characterised by comprising a flat cover layer (52, 68) and the filler elements have a shape matched to the layer.

8. The device according to claim 1, characterised by comprising at least three light detecting elements (22) arranged around the at least one light emitting element (20).

9. The device according to claim 1, characterised by comprising at least one light emitting element (20) being capable of emitting infrared light and at least one light detecting element (22) being capable of detecting infrared light.

10. The device according to claim 1, characterised by comprising a flexible cover layer (12, 42, 52).

11. The device according to claim 1, characterised by comprising a light reflecting layer (14, 46, 54') arranged along the cover layer (12, 42, 45, 52, 68).

12. The device according to claim 11, characterised in that the filler elements (16, 16', 18, 30', 30") fill up the space between the cover layer (12, 42, 45, 52, 68) and the carrier element (24, 38, 43, 57), or the space between the light reflecting layer (14, 46, 54') and the carrier element (24, 38, 43, 57).

13. The device according to claim 11, characterised by comprising a dome-shaped cover layer (12, 45), a dome-shaped light reflecting layer (14, 46) and the filler elements (16, 16', 18, 30', 30") have a shape matched to the layers.

14. The device according to claim 1, characterised by comprising a stiff cover layer (45, 68) and furthermore a flexible ring (48, 70) is attached to the edge of the cover layer (45, 68).

15. The device according to claim 14, characterised in that a protruding stiff object (72) is attached to the stiff cover layer (45, 68).

\* \* \* \* \*

UNITED STATES PATENT AND TRADEMARK OFFICE
CERTIFICATE OF CORRECTION

Page 1 of 1

PATENT NO. : 9,513,178 B2
APPLICATION NO. : 14/358815
DATED : December 6, 2016
INVENTOR(S) : Akos Sandor Tar et al.

It is certified that error appears in the above-identified patent and that said Letters Patent is hereby corrected as shown below:

In the Specification

Column 3, Line 6-7, reads "... and this also increase the size of ..." should read --... and this also increases the size of ...--.

Column 3, Line approx. 14-15, reads "... solutions that the angle of vision of ... make a constraint on ..." should read --... solutions that the angle of vision of ... makes a constraint on ...--.

Column 3, Line approx. 63, reads "... sensor' device with the ..." should read --... sensor device with the ...--.

Column 6, Line approx. 38, reads "... from the opposite side respect to ..." should read --... from the opposite side with respect to ...--.

Column 8, Line approx. 19, reads "... Since the filler element 18 denser than ..." should read --... Since the filler element 18 is denser than ...--.

Column 11, Line approx. 62, reads "... shown as a schematic cross-sectional view by way example ..." should read --... shown as a schematic cross-sectional view by way of example ...--.

Column 14, Line approx. 46, reads "... The components of force F acting on the cove, layer ..." should read --... The components of force F acting on the cover layer ...--.

Column 16, Line approx. 35-36, reads "In many embodiments of the sensor device according to ... comprises a flexible ..." should read --In many embodiments the sensor device according to ... comprises a flexible ...--.

Column 17, Line approx. 27, reads "... behaviour oaf the sensor device." should read --... behaviour of the sensor device.--.

Signed and Sealed this
Seventh Day of November, 2017

Joseph Matal
*Performing the Functions and Duties of the
Under Secretary of Commerce for Intellectual Property and
Director of the United States Patent and Trademark Office*